Dec. 24, 1968     A. F. SAXON     3,417,485
DESOLVENTIZER INCLUDING A STATIONARY VESSEL
AND ROTATING AGITATOR-CONVEYOR
Filed Feb. 1, 1966     4 Sheets-Sheet 1

Fig. 1

INVENTOR.
Arthur F. Saxon
BY *Maurus W. Dodd*
HIS ATTORNEY

INVENTOR.
Arthur F. Saxon
BY
HIS ATTORNEY

Dec. 24, 1968  A. F. SAXON  3,417,485
DESOLVENTIZER INCLUDING A STATIONARY VESSEL
AND ROTATING AGITATOR-CONVEYOR
Filed Feb. 1, 1966  4 Sheets-Sheet 3

INVENTOR.
Arthur F. Saxon
BY *Maurice W. Dodd*

HIS ATTORNEY

Dec. 24, 1968    A. F. SAXON    3,417,485
DESOLVENTIZER INCLUDING A STATIONARY VESSEL
AND ROTATING AGITATOR-CONVEYOR
Filed Feb. 1, 1966    4 Sheets-Sheet 4

— Offset 10° counterclockwise
⊙ Offset 15° clockwise
⤴ Offset 5° as shown

INVENTOR.
Arthur F. Saxon
BY

HIS ATTORNEY

United States Patent Office 3,417,485
Patented Dec. 24, 1968

3,417,485
DESOLVENTIZER INCLUDING A STATIONARY VESSEL AND ROTATING AGITATOR-CONVEYOR
Arthur F. Saxon, Pittsburgh, Pa., assignor to Blaw-Knox Company, Pittsburgh, Pa., a corporation of Delaware
Filed Feb. 1, 1966, Ser. No. 524,042
5 Claims. (Cl. 34—182)

ABSTRACT OF THE DISCLOSURE

My invention comprises a desolventizing or deodorizing vessel in the form of a horizontally elongated cylindrical casing having therein a special agitator conveyor device for lifting and showering and moving the material in a generally lateral direction while at the same time progressing the material longitudinally through a vaporous atmosphere within the vessel. Unique means of controlling the flow level of the vaporous atmosphere within the vessel is provided in the form of a plurality of vertical baffle curtains which extend downwardly from the roof or upper side wall of the vessel. A special material outlet assembly is provided to operate in functional cooperation with the agitator conveyor device making possible a better reaction efficiency. This material outlet assembly comprises a side position dam construction located a substantial distance from the end of the vessel.

---

This invention relates generally to material handling equipment and the method for its use. More particularly, this invention pertains to devices for use in treating either particulate or pulverulent organic solid material to effect the removal of entrained solvent therefrom and to simultaneously heat-treat or toast such material.

Conventional treatment for extraction of residual fats and oil from organic solids such as grain, seeds or animal bones customarily involves the use of an extraction agent or solvent. For example, the conventional solvent extraction treatment of soybeans involves cracking the beans and subsequently flaking them between rolls whereupon the flakes are then deluged with a solvent such as the liquid hydrocarbon hexane, the purpose of which is to dissolve the soybean oil into a solution that can be conducted away from the flaked mass, to undergo a separation process to yield crude soybean oil and recover the solvent for repeated use.

The extracted solids contain a substantial amount of residual solvent which must also be recovered for reuse, requiring a desolventizing treatment of the organic solids, and in instances where the solids are intended for eventual use as a dietary supplement, deodorizing of the material is also usually required. "Desolventizing" in this art can be defined as an operation which removes substantially all of the entrained solvent residing in the material after the extraction treatment, whereas "deodorizing" is considered in the art as a secondary desolventizing operation to effect trace removal of odoriferous components and solvent vestiges which may remain adsorbed in the treated solids. Superheated steam or another inert gas is often used in such a deodorizing step as a desorbent or stripping agent to carry away the remaining solvent traces, and when so desired for specific products, temperature, pressure and residence time are varied so as to achieve a heat treating or toasting effect during the deodorizing treatment.

Heat treatment or cooking of extracted organic solids material is an extremely important process step, particularly when the final product is to be utilized as an animal food supplement. For example, domestic animals of the class known as ruminants or cud chewers, characterized by having a plurality of stomachs, are detrimentally affected by the enzyme, urease, which is present in many organic materials such as soybeans. This enzyme, if present in the meal fed to such animals, will cause urea, also present in the meal, to decompose and release ammonium carbonate in the digestive tract. The meal can be rendered harmless by sufficient cooking which denatures the protein content of the material and kills the urease enzyme. Desirable levels of cooking and resultant protein denaturization will vary with the product and its intended use. In the production of animal food, attainment of the highest possible level of cooking is the practice customarily followed.

Various systems for removal of solvent from solvent-extracted solid particles have been devised, and a notable contribution to the art is the horizontal apparatus and method for its use presented by E. H. Leslie in U.S. Patents 2,571,143 and 2,618,560, both of which are entitled, Desolventizing of Solvent-extracted Particles. No attempt will be made herein to describe in detail the system of Leslie except to the extent that referral will be made thereto to point up how my invention differs therefrom in construction, operation, and results obtained, and how my invention, if incorporated into Leslie's or other such systems, substantially improves the treatment of materials therein and the desirable characteristics of products delivered therefrom.

Systems such as Leslie's employ horizontally elongated cylindrical vessels as desolventizing and deodorizing apparatus. Material to be desolventized is passed into such a vessel through an opening at one end thereof and is subjected therein to a heated fluid or vapor which may be a volatized form of the same solvent entrained in the material, superheated steam, or an inert gas such as carbon dioxide. The material to be treated is usually conveyed through the vessel by a rotation device which not only moves the material along the vessel's length toward its output end but agitates and reorients the material particles during such longitudinal movement. In the use of such vessels it is recognized as very important to achieve a thorough mixing of the particles with the vaporous atmosphere within the vessel so that all surfaces of the particles are contacted and a thorough penetration of the vapor into the material is achieved. It is considered equally important to be able to variably control the amount of heat to which the material is subjected, which in turn, determines structural characteristics, protein denaturization, and final appearance of the treated particles.

The present invention constitutes a new and improved construction for a horizontal desolventizing or deodorizing vessel utilizing a unique means of handling material introduced thereto. One feature of the invention is a device for the conveying of solids material through the vessel which simultaneously agitates and continuously showers the material to achieve a more thorough intermixing of particles through a desolventizing fluid atmosphere. A novel means of controlling or directing the flow path of the desolventizing fluid atmosphere is also provided to gain better dispersion of the fluid flow through the agitated material, and the vessel is provided with a newly-conceived outlet means by which residence time and thus, the degree of treatment can be substantially varied. My invention will be found most useful when utilized as part of a desolventizing or deodorizing system for solvent removal treatment where it is of prime importance to be able to regulate the characteristics of the final product.

In vessels heretofore, one popular means of progressing material horizontally through the vessel has been a cagelike structure having a helical ribbon or screw with longitudinal bars spaced apart circumferentially around the screw's outer edge to create a cage-like framework suspended between rotating plates vertically mounted within each end of the vessel.

In a number of desolventizing systems, the cage conveyor has been replaced with a device comprising a rotatable longitudinal through-shaft having circumferentially disposed paddles that are radially extended therefrom. Such paddles may be respectively attached to the outer end of their radially extended respective arms in a pitched manner so that solid particles are moved through the vessel with a turning or rolling motion. Such paddles are usually welded to the end of their respective extended arms at a predetermined angle of divergence to the center shaft. A problem in the construction of such a conveying device is that the paddles, once welded, cannot be readjusted for treating materials of different consistency or to achieve, when desired, a specific final product having certain structural characteristics. Though it would seem obvious that such paddles could be constructed to be adjustable so that their angle of divergence could be varied in accordance with desired effects, such adjustment has heretofore been shown to be impractical and unworkable. Paddles that are not fixedly attached by means of extremely rugged construction are easily loosened under the strain of constant use, and such loosening results in maladjustment that generally requires considerable "down time," during which the vessel must be evacuated of all material so that repairs can be made.

It has been my observation that there are inherent problems in desolventizing and deodorizing vessels of the prior art, regardless of the type of prior art conveyance means that is utilized. Inefficiency of reaction within the vessel is a constant problem. Notwithstanding attempts to lift the material in a circular fashion in a lateral direction during its progression through the vessel, poor penetration of the material solids by the contacting fluid within the vessel results in the need for an excessively large volume of contacting fluid to process a given amount of material. The contacting fluid flow which is normally introduced into the vessel near the output end and conducted away from the vessel to an opening near the input end thereof has a tendency to establish a natural flow pattern that, while substantially countercurrent to the direction of material conveyance is unfortunately substantially on a plane above it, rather than through it. For example, in the aforementioned apparatus of Leslie, steam introduced into his deodorizer vessel will tend to follow a natural flow channel that is contiguous and just beneath the roof or upper side wall of the vessel. Although Leslie's conveying mechanism is designed to lift and shower the material as it progresses from one end of the vessel toward the other, I have observed that such showering actually takes place beneath and not through the channel of flowing steam that moves in a horizontal direction across the upper region of the vessel. Thus, it has been my observation that it would be desirable to have a means of depressing the steam flow channel to a lower level so that material could be made to shower therethrough and so that the bulk of the material which tends to pile up from gravitational force on the floor of the vessel to fill the bottom region thereof would be subjected to a constant flow and contact of such steam.

Another major problem of vessels of the prior art is concerned with the conventional means of discharging material from the vessel. A bottom opening is usually provided with an output conduit connected thereto and such a conduit may have a variable speed vapor seal valve means to regulate the rate of flow of material from the vessel. In the treatment of many materials, well-treated, loosely adhering particles tend to remain at the upper level of the material in the horizontal midregion of the vessel while heavier conglomerated material which needs to undergo continued treatment tends to fall toward the bottom of the vessel and is hence the first to be discharged through the output opening, and varying the rate of discharge will do nothing to change the positional relationship of particles within hte material mass. Thus, I have observed that it would be more beneficial to be able to withdraw treated material from a level nearer the surface of the material mass while at the same time being able to control such withdrawal so as to selectively determine the residence time of the material within the vessel.

Horizontal treatment vessels of the prior art have also tended to have a non-reactance region in the output end of the vessel, particularly when utilizing the cage-type of conveyor device to move material therethrough. In such apparatus, unless material is allowed to discharge at a rate of flow equal to the speed of conveyance of the material through vessel, the material will tend to be squeezed against the flat output end of the vessel where it is piled up in a mass extending substantially the full height of the vessel. The constant turning of the conveyor tends to pack the material more and more tightly against the vessel's inner end wall even to the extent of compacting the material such that it will not discharge freely through the outlet conduit, and further that the contacting fluid is unable to penetrate through such a dense consistency, and, depending upon the nature of the material, crushing and grinding of the particles against each other with resultant structural fragmentation may take place. I have thus observed that it would be desirable to have means to maintain the material in the output end of such a vessel in a loose and non-impacted condition so that reaction may continue without substantial reduction right up to the point of material discharge and so that individual particles will not be subjected to breakage, physical distortion, or compaction.

I have also observed that conventional desolventizing and deodorizing equipment is inflexible to the extent that it is limited in its construction to the processing of a limited class of similar materials, I have recognized that it would be desirable to have in a single unit a desolventizer or deodorizer apparatus which could be more widely variably-adjusted and controlled so as to efficiently treat a large number of dissimilar materials.

In accordance with the foregoing observations and my conclusions drawn therefrom, it is a primary objective of my invention to provide a new and improved desolventizing or deodorizing apparatus that is adjustably adaptable for treatment of a wider range of material as compared to apparatus utilized heretofore. This objective is considered of extreme importance, since not only are conventional desolventizing and deodorizing vessels undesirably limited in structure to the treatment of certain specific materials, but recent developments and contemplated future advancements in technology indicate that demand for processing of new and divergent materials will, in turn, require wide processing flexibility on the part of the manufacturer. Even at present, many manufacturers find that changing market conditions require large capital expenditures for new equipment, since the market may require processing that cannot be attained with an existing plant installation.

It is a further object of my invention to provide vastly improved means for achieving contact between a desolventizing fluid and material undergoing desolventization or deodorization.

It is also an objective of my invention to provide a means to more beneficially direct and control the flow and dispersion of a desolventizing fluid within a desolventizing vessel.

It is a still further objective of my invention to provide a unique means of variably-controlling the rate of discharge of material from a desolventizing vessel and thus control the condition and structural characteristics of material discharged therefrom.

Another objective of my invention is to substantially reduce the quantity of vapor required as a desolventizing fluid in a desolventizer vessel.

Another object of my invention is to improve the desolventizing or deodorizing treatment within such vessels to the extent that satisfactory treatment can be accomplished in less time and in substantially smaller vessels.

It is another object of my invention to make possible more efficient desolventizing and deodorizing treatment of either particulate or pulverulent organic solids.

In accordance with the preceding objectives, my invention comprises a desolventizing or deodorizing vessel in the form of a horizontally elongated cylindrical casing. Material to be treated within the vessel is conducted from the input end thereof and through the vessel toward its output end by a special agitator-conveyor device which is a new and improved means for lifting and showering the material in a generally lateral direction while at the same time progressing the material longitudinally through a vaporous atmosphere within the vessel. A unique means of controlling the flow level of the vaporous atmosphere or contacting fluid within the vessel is provided in the form of a plurality of vertical baffle curtains which extend downwardly from the roof or upper side wall of the vessel and are spaced apart from each other and positioned critically in relation to the contacting fluid inlet and outlet ports of the vessel. A newly conceived material outlet assembly is provided to operate in functional cooperation with my special agitator conveyor device, the combination making possible a new plateau of reaction efficiency and better controlled variance of such reaction as compared to the horizontal desolventizing treatment vessels of the prior art.

With conventional desolventizing and deodorizing vessels, the screw flight or cage-type of conveyor tends to move material through the vessel along a low-level path adjacent to the shell wall thereof. Since material is taken out of the vessel through an opening in the bottom thereof, it is permissible, if not necessary, to convey it longitudinally along the vessel's lower inner wall. However, in order to assure a free flow of discharge of material from the vessel, such conventional devices are necessarily limited to relatively shallow beds.

On the other hand, my provision of a side-positioned dam construction in conjunction with my agitator-conveyor overcomes the limitation to shallow material beds, permitting the use of material beds of greater and selectable depth. Material is advanced through my vessel by means of my agitator-conveyor at the same time that it is showered through a substantially countercurrent channel of desolventizing vapor. Full utilization of such operative characteristics of my agitator-conveyor is dependent upon the presence of the dam or adjustable side panel which I provide as a component of my solids outlet assembly. Conversely, the effective utilization of my solids outlet assembly is dependent upon the design and consequent operational characteristics of my agitator-conveyor and the effect created by my baffle curtains extending downwardly within the vessel. It is the cooperation between these primary components of my invention which makes possible longer detention times of material within relatively smaller vessels, permitting more effective desolventizing or deodorizing treatment of a comparatively larger bulk of material per unit time.

Advantages, specific features, and other objects of the present invention will be apparent to one skilled in the art from the ensuing detailed description when read in reference to the accompanying drawings in which.

In the ensuing description for purposes of illustration, particular reference will, at times, be made to the treatment of soybean flakes that have been previously subjected to an oil extraction treatment wherein an organic solvent such as the liquid hydrocarbon hexane was utilized to dissolve the oil therefrom. Such limited reference is not meant to be construed in any manner as a limitation on the scope, adaptability, or versatility of this invention.

The treatment vessel

Figure 1:
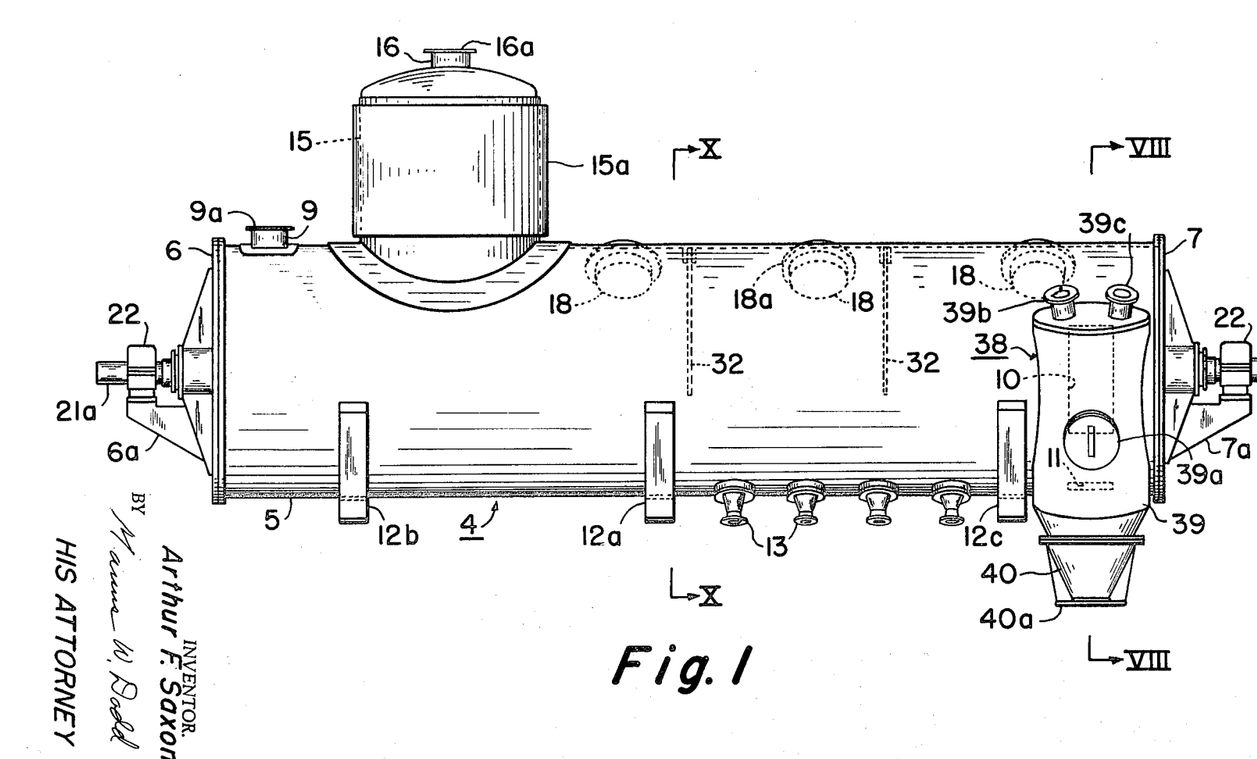
FIGURE 1 is a side view in elevation showing a preferred embodiment of my desolventizer or deodorizer vessel.

Referring first to FIGURE 1, the apparatus in accordance with my invention comprises a horizontally elongated desolventizing tank or cylindrical casing 5 with end plates 6 and 7 attached at opposite ends of the casing 5 to form an enclosed reaction chamber 8 therein. One contemplated embodiment of my invention includes a vessel 5 having a length of about thirty feet and a diameter of over seven feet. For its installation at a desired plant location, a plurality of arcuate supports 12 are suggested for the vessel, with the center support 12a being fixedly attached to the casing and other supports 12b and 12c to either side of the center support 12a being free to slide so that their precise location can be adjusted in accordance with the nature of the platform on which they are to be mounted and to allow for expansion-contraction of the vessel 5 itself.

A solids inlet nozzle 9 is provided at one end and at the top of casing 5 to receive material to be treated within the chamber 8, having an upper annular flanged collar 9a so that an input conduit (not shown) having a similar flanged end can be bolted thereto by means of a common gasket seal connection. After treatment within the casing 5, solid material is finally discharged from the apparatus shown in FIGURE 1 through solids outlet assembly 38 subsequently described herein in detail, which may lead to other apparatus in the desolventizing system or to a simple conveyor means leading to a storage or loading area. A plurality of fluid injection nozzles 13 are provided to which input pipes (not shown) are to be connected so that the injection nozzles or ports 13 will direct an upward flow of contacting fluid such as steam or other inert gas into the reaction zone or interior chamber 8 of the vessel. A substantially large vapor outlet dome 15 is mounted in a saddle fashion on the cylinder 5 in open communication with chamber 8 below, having an outlet flanged opening 16 through which solvent-laden fluid may be exhausted. Condensation within dome 15 is prevented by a steam jacket 15a. Condensing means and solvent separating apparatus (not shown) receives the vaporous output of the casing 5 through the opening 16 of the dome 15 by means of a pipe that would be joined to the upper flange 16a around opening 16.

A plurality of openings or manways 18 are provided through the upper side wall of the casing 5 to provide general access to the interior of the vessel. The manways 18 are spaced apart longitudinally to strategically locate them not only for general access to the reaction chamber 8 but also to enable the installation of certain elements of the invention which will be described in greater detail further in this description. Each of the manway openings 18 is provided with a cooperating removable circular cover plate 18a which can be removed to permit access to the interior of the casing 5.

*The agitator-conveyor*

The special agitator-conveyor device 20 (FIGURE 2) that is housed within the vessel 5 (first shown in FIGURE 1) comprises a rotatable thru-shaft 21 supported at its journaled ends by suitable pillow blocks 22 which must be ruggedly supported by mounting means such as support arms 6a and 7a which can be welded to jut outwardly from respective vessel and plates 6 and 7. As shown most clearly in FIGURE 2, the rotatable shaft portion 21 of my agitator-impeller device 20 is, in the preferred illustrated embodiment, a slender rigid tube or shell which is slightly shorter in length than the horizontal length of the vessel's interior, and each end of this shaft shell is provided with a solid cylindrical shaft stub or journal end portion 21a that has a diameter substantially less than the shaft shell 21. The stub shaft portions 21a can be connected within its respective end of the shaft shell 21 by typical means such as spacing collars 21b jointed to the inside surface of the shell 21 and to the outer surface of the corresponding stub shaft 21a, or by other means commonly utilized in such practice. A suitable annular bushing 21c should be provided to sealably support each of the stub shafts 21a where they respectively extend through vessel end plates 6 and 7.

Figure 2:
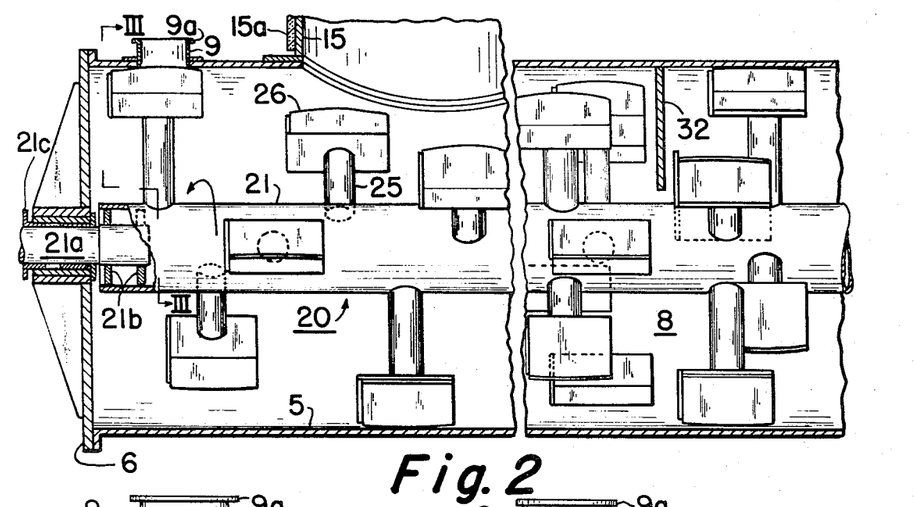
FIGURE 2 is a view of two portions of the apparatus shown in FIGURE 1, here shown cut away to reveal portions of my special agitator-conveyor device which is housed within the vessel.
Figure 3:
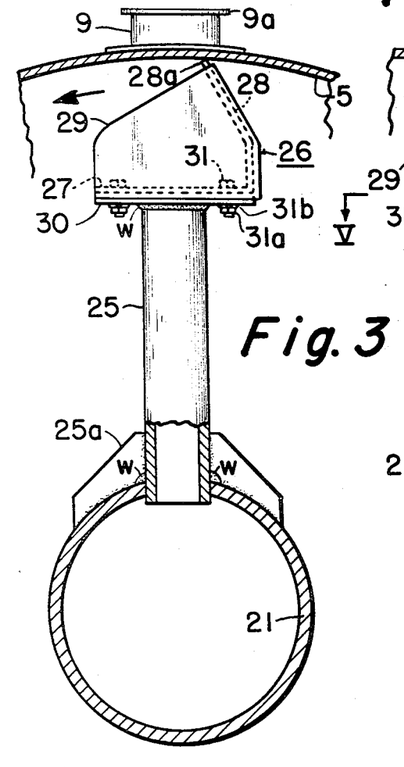
FIGURE 3 is a view of a broken vertical section taken along line III—III of FIGURE 2 and showing details of the construction of a typical scoop or bucket utilized in a preferred embodiment of my invention.
Figure 4:
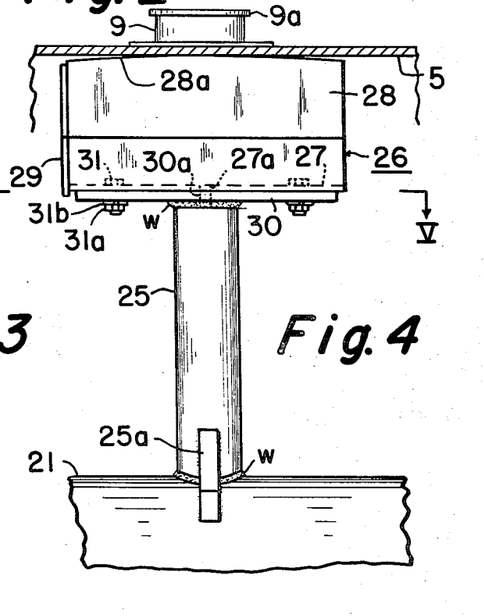
FIGURE 4 is a side elevational view of the bucket shown in FIGURE 3.

As shown in FIGURE 2, the rotatable shaft 21 is provided with a plurality of radially-extended rods or arms 25, each of which has affixed to the end thereof a paddle in the form of a scoop or bucket 26. A preferred method of attaching an arm 25 to the shaft 21 is by means of an annular weld "w" as shown in FIGURE 3. In one preferred embodiment of my apparatus, such as might be used in the deodorization treatment of soybean flakes, arms are extended from the shaft 21 from twenty-six points spaced along the length thereof, as indicated by the letters A to Z on the diagrammatic illustration, FIGURE 9. As shown in FIGURE 2 and further illustrated diagrammatically in FIGURE 9, the region 8 of the treatment vessel 4, near the input end thereof is provided with a lesser number of bucket-like paddles 26 to rotate therethrough as compared to the remaining region further on toward the output end of the vessel 4. Having recognized that material, immediately following its entrance into the vessel 5, will be of a thicker, exceedingly moist and self-adhering consistency, I have provided that fewer arms 25 are present in this area, and I have further provided that the arms 25 in this area should be ruggedly supported at their point of attachment to the shaft shell 21a. For this purpose I have provided gussets 25a, as shown in FIGURES 2 and 3.

Figure 9:
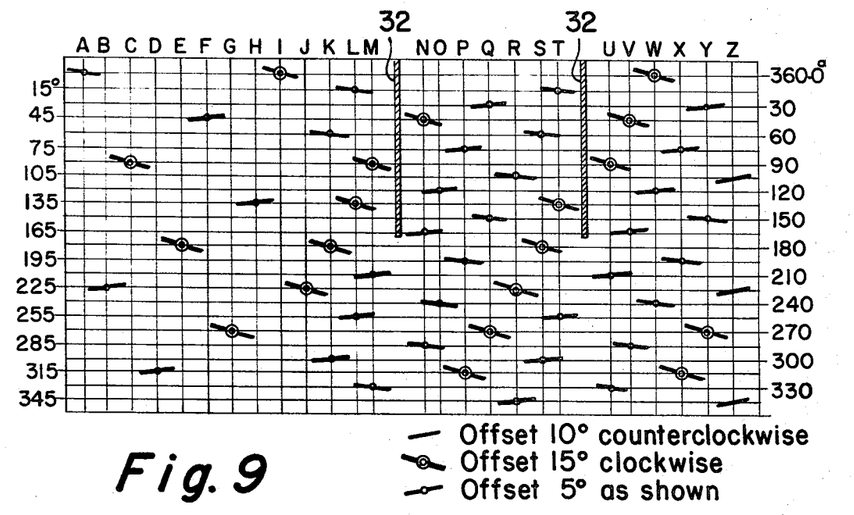
FIGURE 9 is a diagrammatical layout to illustrate preferred angles of divergence for respective buckets and their circumferential positioning in relation to the shaft from which they are extended and in relation to each other.

Beginning at the end of the shaft 21 nearest the input end of the vessel 4, the first ten of the extended arms 25 are equidistantly spaced apart, as represented by the vertical lines A through K on the diagrammatic layout FIGURE 9, whereas, on the same figure, vertical lines L through Z represent groups or clusters of radially extended arms 25, with each cluster comprising three such arms disposed circumferentially around the shaft 21 in the same vertical plane so that their axes begin on a common point on the axis of the shaft 21 from which they extend.

As shown by FIGURES 3, 4, 5, and 6, each of the buckets 26 utilized in my agitator-conveyor device 20 comprises a bottom or floor plate portion 27 (FIGURE 6) with a scoop-shaped back wall portion 28 that extends upwardly from the floor plate 27 at a 90° angle thereto. The back wall 28 cants inwardly along a straight horizontal intermediate break line so that it forms a concave surface configuration that faces toward the floor plate 27 to which it is attached and toward the direction in which the bucket 26 will rotate. A single side wall portion 29 is provided as part of the bucket 26, with the corner thereof which is disposed toward the direction of rotation of the bucket 26 being smoothly rounded. The three wall portions making up the bucket 26 structure, that is the floor plate 27, back wall 28 and side wall 29 are welded together along the contacting edges thereof to form the bucket configuration. The extreme upper edge of the back wall 28 is purposely extended above the side wall 29 to form an extended gathering lip 28a which will move parallel to the curved inner surface of the casing 5 as the agitator-impeller 20 is rotated therein.

Beneath the floor plate 27 of the bucket 26 is a mounting platform or index plate 30 that is welded to the end of the radial arm 25 by means of an annular weld "w." The index plate 30 is shown in an octangular configuration but it could be in an oval shape or any other preferred form that would eliminate sharp material-gathering corners that would extend outwardly when an attached bucket 26 is positioned thereon at a divergent angle.

Figure 5:
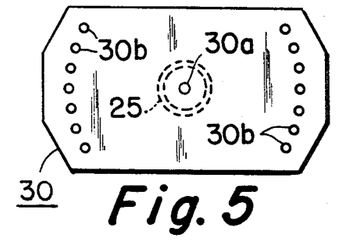
FIGURE 5 is a horizontal sectional view taken along line V—V of FIGURE 4 and shows a preferred configuration of and constructional details for a typical mounting platform or index plate to which each bucket in my apparatus is attached.
Figure 6:
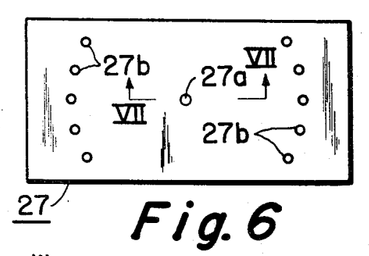
FIGURE 6 is a top plan view of the floor or bottom portion of a typical bucket utilized in my apparatus.

Indexing holes 27b and 30b are drilled through both the bucket's floor plate 27 and the index plate 30 as shown in FIGURES 5 and 6. On both plates 27 and 30 the holes drilled therethrough are spaced apart along an arc line struck on an identical radius extended from a respective center point thereon.

Figure 7:
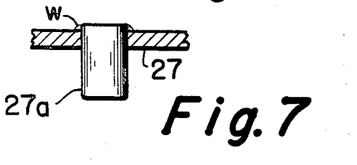
FIGURE 7 is a horizontal sectional view taken along line VII—VII of FIGURE 6.

In the embodiment shown in the drawing, the index plate 30 is provided with seven equidistantly spaced holes 30b along each of two oposite edges, and radius lines extended from the center point of a plate 30 and through the center points of the holes 30b would form between adjacent lines angles of 10°. To cooperate with the index plate 30, the floor plate 27 of the bucket 26 is provided with similar holes 27b drilled on an arc line the same distance from the center point, but for the floor plate 27 only five holes 27b are provided along each opposite edge thereof and adjacent holes 27b thereon are spaced apart at angles of 15° in respect to the center point thereof. The arrangement of the holes 27b through the floor plate 27 cooperates with the greater number of holes 30b provided through the index plate 30 to allow a bucket 26 to be adjusted in relation to its index plate 30 at discrete angles of adjustment in increments of 5°. I have found that a dependable means of connection between the bucket 26 and the index plate 30 therebeneath will preferably include the use of four snugly-fitting bolts 31 that will be spaced two along each side edge of the bucket floor plate 27 to join it to the index plate 20 by such means as hex nuts 31a and lock washers 31b. The hole arrangement on the two plates 27 and 30 is such that if a bucket 26 is positioned on the index plate 30 with the respective long edges of the plates in coincidental alignment, the bucket 26 can be pivoted on its centering pin 27a (shown in FIG- URE 7) which slides into an opening 30a of the plate 30, either clockwise or counterclockwise at increments at 5° so that four of the holes 27b in the bucket floor plate 27 will come into vertical alignment with four of the holes 30b of the index plate 30. The use of four bolts 31 as preferred in this embodiment permits the rotation of a bucket 26 on its corresponding index plate 30 plus or minus twenty degrees in either direction while still fastened to its plate 30 at the extreme positions by means of two bolts 31. Such extreme rotation is beyond that which is normally required for the bucket's functional purpose. An annular weld "w" is the means of permanently attaching each radial arm 25 to the shaft 21, as shown in FIGURE 3. It may be found expedient to provide the arms 25 with reinforcing gussets such as 25a.

The vertical lines K through Z of FIGURE 9 indicate groups of three arms 25, each with a bucket 26 thereon. Each such group comprises three arms radially-extended like spokes in a wheel so that their respective buckets 25 are disposed circumferentially about the shaft 20, whereas vertical line A of FIGURE 9 represents a single arm 25 extended from a point on the shaft shell, and line A is representative of line B through J, each of which constitutes a single arm 25, rather than a three arm spoke-like cluster as represented by the lines K to Z.

FIGURE 9 also diagrammatically illustrates the relative positioning of arms 25 in relation to each other. Reading first across the top of FIGURE 9, if A represents the first arm 25, and the positioning of all other arms 25 on the shaft 21 are considered in relation to the point of attachment of arm A thereon, then the respective degree of divergence of other arms relative to arm A can be determined by reference to the angle scales shown vertically on the right and left sides of FIGURE 9 which apply to a circle representing the circumference of the shaft 20 at any point along the length thereof.

Figure 12:
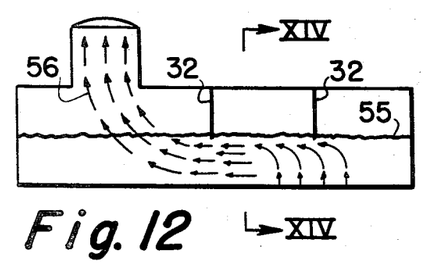
FIGURE 12 is a diagrammatic representation illustrating a more desirable and effective fluid flow pattern that is achieved through the use of the present invention.

In the operation of this invention as a deodorizer, solids material such as soybean flakes containing residual hexane traces are passed into the vessel through inlet opening 9. The agitator-conveyor device operates to progress the soybean flakes through the length of the vessel while at the same time continuously raising the flakes and showering them through a continuous concurrent flow of steam that is injected into the vessel by means of ports 13. The buckets 26 that are radially extended at points along the length of the rotating shaft all are disposed at various respective angles (preferably as indicated in FIGURE 9) in relation to the axis of the shaft 21 to achieve a thorough intermixing of the flakes within the vessel. Although the pattern of agitation and material advancement through the vessel can be varied in an infinite number of ways by altering the preferred layout of angled buckets as shown in FIGURE 9, a prime factor to be considered in establishing the specific angle positions of the buckets 26, regardless of the type of product under treatment, is the nature of the steam flow through the vessel. Substantial and rapid showering of flakes is particularly desirable in the middle region of the vessel where the steam flow is concentrated as indicated by arrows in FIGURES 12 and 14. It is also desirable, in this middle or high-reactance region, to advance the flakes therethrough at a faster rate as compared to the relatively low-reactance input and output ends of the vessel.

The Baffles

Figure 10:
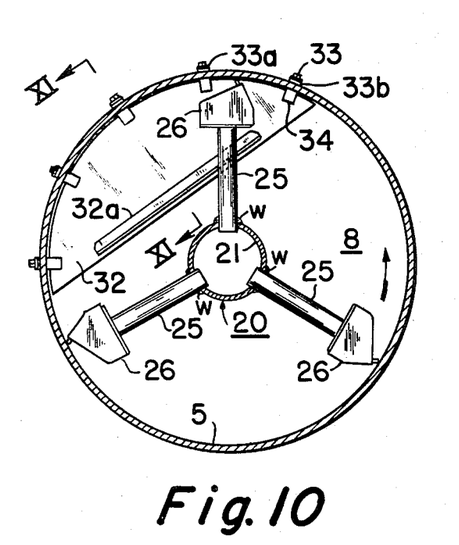
FIGURE 10 is a view of a vertical section taken along the line X—X of FIGURE 1.

The means which I utilize in my invention to more benefically direct the level of flow of contacting fluid injected into the vessel 4 comprises a plurality of baffle curtains 32 attached in a fixed position as indicated in FIGURES 1 and 2 and shown most clearly in FIGURE 10. A baffle 32 as shown comprises a flat plate having a semi-circular shape so that the curved edge thereof will conform to the inner wall of the vessel 4 to which it is firmly attached. The thickness of the metal utilized in constructing the baffle 32 can be substantially thin sheet metal to minimize the baffle's weight and slender angle irons 32a can be attached near the baffle's lower edge as shown in FIGURE 11 to add rigidity thereto.

Figure 11:
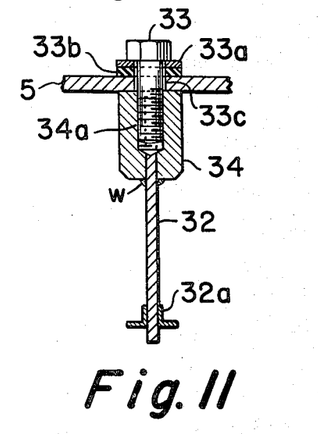
FIGURE 11 is an oblique sectional view taken along line XI—XI of FIGURE 10.

In the embodiment shown in FIGURES 10 and 11, each baffle 32 is attached to the upper side wall of the casing 5 by means of a plurality of cap screws 33 that are inserted down through spaced apart holes provided therefor through the vessel's upper wall. Each cap screw 33 is joined to the baffle 32 by means of a piece of square bar stock 34 that is fitted into a slot provided in the upper edge of the baffle 32 and each bar 34 is permanently welded within its slot by welds "w." The bar 34 is provided with a longitudinal threaded bore 34a to receive a cap screw 33, and a deformable gasket 33b such as neoprene is utilized to form a hermetic seal beneath a washer 33a which rests under the head of the cap screw 33 and the outer surface of the casing 5.

The specific design of the means of attaching the baffles 32 to the interior wall of the casing 5 is considered critical to the operational efficiency of the invention. Before arriving at the present design wherein cap screws 33 are extended through the wall of the casing 5, attempts were made to bolt the baffles from inside the vessel by providing spaced apart projections which were welded to the interior surface wall of the casing 5 so that bolts could be slipped through peripheral openings in each baffle 32 and through holes provided in the cooperating projections. It was found that installations of the baffles with the agitator-conveyor device already in position was extremely difficult, requiring that the baffles be constructed in bolt-together sections to enable their installations in their respective positions between extended rows of arms from the agitator-conveyor 20.

Thus, in a preferred embodiment of the invention, each baffle 32 as shown in FIGURE 10 is installed simultaneously with the installation of the agitator-conveyor device. Prior to installation of the agitator-conveyor, it is suggested that the shaft 21 thereof be supported outside the casing 5 while the respective scoops or buckets 26 are attached and angled in accordance with the diagrammatic layout shown in FIGURE 9. Just before sliding the agitator shaft, with its extended buckets 26 properly positioned, into the casing 5, the baffle plates 32 may be wired to these agitator arms which will be nearest to the rows of holes 33c provided through the wall of the casing 5. Then, with the agitator shaft positioned properly within the casing 5, it is possible to reach in through the manways or openings 18, cut and remove the wires and maneuver the baffle plates 32 into cooperative relation with the holes 33c to allow insertion of the cap screws 33 into the respective threaded blocks 34. Proper tightening of the cap screws 33 can be effected from a position outside the casing 5. It is then possible to periodically check the cap screws 33 to determine if they have been loosened by vibration over a period of time, whereas using sectionally-formed baffles which were bolted entirely from an interior position within the casing 5 as first atempted created a problem when bolts tended to loosen. Extensive "down time" to correct loosened bolts is thus avoided, as is the damage to the agitator-conveyor 20 which would result from a baffle section falling down into the vessel during operation.

In a preferred embodiment of the invention, the center line or axis of the agitator-conveyor shaft 21 is positioned ¼" below the longitudinal axis of the casing 5 in order to allow a slight clearance between the lip 28a of each bucket 26 and the upper inside surface of the casing 5 while at the same time assuring that space between the lip 28a and the bottom inside surface wall of the casing 25 will be substantially non-existent. Such construction assures that material in the extreme depth of the treatment bed within the casing 5 will not be passed over by the revolving buckets 26.

Solids outlet assembly

Figure 8:
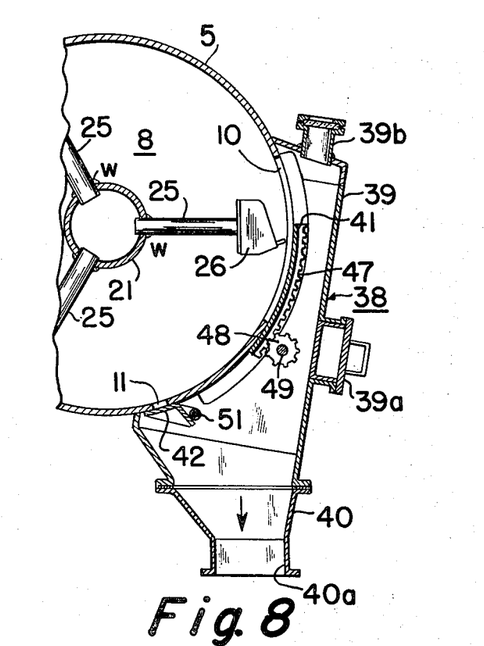
FIGURE 8 is a view of a vertical section taken along line VIII—VIII of FIGURE 1 showing details of the construction of the solids outlet assembly that is a feature of the combination of the present invention.

The part of the combination which makes up the apparatus of my invention that I refer to herein as the solids outlet assembly 38 is shown in FIGURES 1 and 8 particularly. It broadly comprises a side opening or primary material outlet provided through the side wall of the vessel casing 5, a smaller secondary opening 11 provided directly below the opening 10 through the bottom side of the vessel 5, an adjustable panel or dam 41 which can be moved up or down to create a movable weir in cooperation with the opening 10, a removable trap door covering the secondary opening 11, and an outer material-receiving cylindrical enclosure 39 intersecting and attached to the cylindrical side wall of the vessel casing 5 and fully enclosing the primary opening 10 and the secondary outlet opening 11. The movable panel or dam 41 is formed so that its inner surface concavedly conforms to the outer surface of the vessel casing 5. A means to vertically slide the panel 41 to adjust the height of the weir or the size of the opening 10 is provided as partially shown in FIGURE 8 and includes a rack and pinion assembly with the pinions 48 fitted to a shaft 49. Opposite ends of the shaft 49 extend to suitable bushing mounts (not shown) situated in opposite side walls of the enclosure 39. One end of the pinion shaft 49 extends through and beyond the bushing mount in the wall of the enclosure 39 so that the shaft and thus the pinions thereon may be manually rotated by a ratchet to regulate the position of the panel or dam 41. The pinions 49 mesh with toothed racks 47 fastened to the outer surface of the panel 41.

A clean-out passage such as 39a shown in FIGURE 8 may be provided to allow access to the interior of the enclosure 39 as desired. The lower end of the enclosure 39 is provided with a transitional section 40 to enable the enclosure's connection to a typical output conduit (not shown) so that solids material will pass from the solids assembly through an opening 40a.

The secondary opening 11 is maintained closed by means of the hinged cover 42 during operation of the apparatus, and the cover or trap door 42 is hingedly connected to a shaft 51 so that one end thereof can be rotated from a point outside the enclosure 39 to open the trap door 42 and allow material to pass through the opening 11 so that the vessel may be entirely evacuated of solids material when processing of a specific product within the apparatus is completed.

The enclosure portion 39 of the solids outlet assembly 38 may be modified to include a glass covered visual opening 39b and a housing 39c containing a lamp fixture to provide light within the enclosure 39 so that the effect of adjusting the dam 41 can be viewed from an exterior position by peering in through the glass enclosed aperture 39b.

The adjustable dam 41 provides a unique means of selectively controlling residence time for solids material under treatment within the vessel 4. By raising the height of the weir or dam 41 at opening 10, which is in alignment with the last cluster or row of radially extended buckets 26, the quantity of solids material passed from the vessel 4 by means of the buckets 26 which raise treated material and push it over the weir can be selectively reduced so as to allow attainment of a desired degree of heat treatment with a precision not possible heretofore.

Adaptability of the invention

Figure 13:
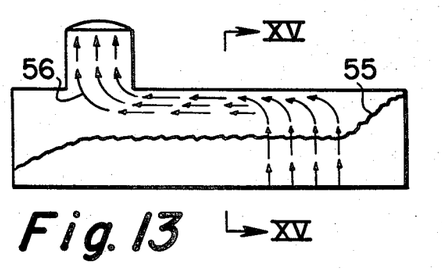
FIGURE 13 is a diagrammatic representation of a conventional desolventizing vessel with arrows utilized to portray flow path characteristics of a contacting fluid through such a vessel.

It is expressly anticipated that any of the various elements of the combination introduced in this specification could be utilized separately to substantially improve the efficiency of a conventional desolventizer or deodorizer vessel. The possibility of gaining improved efficiency by such adaption can be demonstrated with reference to FIGURE 13 which graphically illustrates the nature and level of steam flow in relation to the solids material progressed through a conventional vessel. The arrows 56 represent the *primary* path of steam flow; the arrows 56 are not intended to suggest that steam would not otherwise be present throughout the interior of the vessel. Incorporation of my agitator conveyor device would require the use of less steam in the process and also assure greater contact of steam to all surfaces of the particles of the solids material within the vessel, and further, the distribution of the mass of solids material through the vessel would be more uniform. Even without the addition of the baffles 32 to function in cooperation with the agitator-conveyor device, the improved showering effect obtainable through the use of my buckets 26 would provide improved deodorization and heat treatment per unit time.

The agitator-conveyor device 20 can be adapted to the specific nature of the solids material to be treated. In addition to varying the speed of rotation of the device, the buckets 26 can be selectively positioned on their respective index plates 30 to vary the showering and material advancement characteristics within the chamber 18. The construction of each index plate 30 could be such that would permit extreme rotation of a bucket 26 thereon as compared to the five degree through fifteen degree range illustrated in the diagrammatic FIGURE 9. It is, however, suggested that extreme rotation of adjacent buckets 26 would interfere with the characteristics of co-reactance between buckets.

For example, buckets 26 which revolve through the same vertical plane as indicated by the vertical line K of FIGURE 9 tend to extend into the pathway of showering reactance of the buckets in adjacent groups J and F. Consequently, material will be advanced from group J and across the path of the buckets in group K, thus showering and advancing material directly into the zone or pathway of reactance of the buckets in group L. In a like manner, two of the buckets 26 in group L will advance and shower the material from thereon toward the output end of the chamber while the third bucket of row L which is canted toward the input end will tend to cast material back across the reactance path of group K and into the path of group J. Each bucket 26 within the chamber 18 has an edge thereof extending into the path of each adjacent group of buckets 26, and the angled position of each bucket causes it to have an influencing effect not only on its immediately adjacent bucket but also upon alternate groups which are spaced more distantly therefrom. This interaction between alternate groups of buckets would be reduced if not entirely removed either by positioning the buckets with their respective back walls parallel to the axis of the shaft or by canting all the buckets in successive groups or clusters in the same general direction. Inner action between alternate groups of buckets along the length of the agitator-conveyor device is considered extremely important in increasing the rate of desolventization within the chamber.

The showering interaction between alternate regions of buckets is also an important characteristic in that it makes the agitator-conveyor device operationally compatible with the baffles 32. As shown in FIGURE 9, because of the presence of a baffle 32 between adjacent groups M and N, the buckets of group M cannot overlap into the reactance path or plane of revolution of group N. Clearance must be provided so that revolving buckets 26 will not strike the baffle 32. Such clearance does not however curtail the progress of material through the region where the baffle is present. Buckets 26 of group M will transfer material onward to be received by the buckets of group N despite the fact that buckets of the two groups do not actually overlap into the same plane as do other pairs of adjacent rows along the length of the shaft 21.

Figure 14:
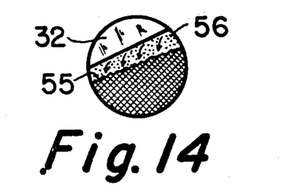
FIGURE 14 is a diagrammatic presentation taken generally along the line XIV—XIV of FIGURE 12 to illustrate preferred fluid flow characteristics in relation to solids under treatment in the present invention.
Figure 15:
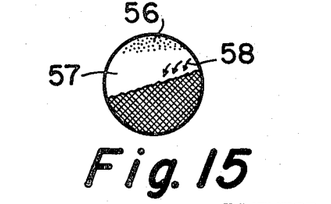
FIGURE 15 is a diagrammatic representation taken generally along line XV—XV of FIGURE 13 and will be utilized herein to illustrate fluid flow characteristics in relation to a mass of material under treatment in a typical conventional deodorizing vessel.

A major problem with prior art conveyance devices, whether of the cage type or of the type having extended arms with flat paddles thereon, is that the solids material is not carried high enough before showering is commenced and thus, as shown in FIGURE 15 by arrows 58, showering of particles takes place substantially beneath the upper-level flow of steam and the showered particles are not evenly distributed across the interior of the vessel. However, the buckets 26 of my agitator-conveyor device 20 tend to contain the particles therein until a much higher point within the vessel is reached so that showering distribution takes place across a substantially wider lateral space, as shown in FIGURE 14. With the incorporation of baffles 32 to function in cooperation with the agitator-conveyor device, an intermediate steam flow path is established as shown in FIGURE 14 so that particle showering takes place directly through the highest concentration of steam flow within the vessel.

The solids outlet assembly 38 as shown in FIGURE 8, even if utilized alone to improve the performance of a conventional vessel, provides a means to control the rate of material discharge and thus a means to selectively increase or decrease the residence time of solids material under treatment.

A notable feature of the solids material outlet assembly is that it can be adapted to have means such as housings 39b and 39c to observe the condition of material while such material is still on the inside of the vessel. Thus, material appearing to need further treatment can be held within the vessel until the observable characteristics of the particles indicate that the desired treatment has been completed.

Incorporation of one or several of the elements presented in this specification to various different structures of horizontal vessels is contemplated. For example, vessels of the type which have a plurality of spaced apart steam exhaust domes instead of the single dome 15 as shown in FIGURE 1 would have the operational efficiency thereof significantly increased with the addition of each of the elements presented herein. Also, substantially improved performance could be attained in a vessel having the point or points along the vessel length where the contacting fluid flow is introduced thereto from a point substantially changed from the location of ports 13 shown in FIGURE 1.

What I claim is:

1. Apparatus for use in treatment of organic particulate material comprising: a horizontally elongated cylinderical treatment vessel; an input opening in the side of said vessel near one end of said vessel and an adjustable height weir opening near the other end of said vessel; means for moving the material to be treated through said vessel in a regular manner while maintaining the level of said material at a substantially constant height along the length of said vessel and showering said material during its passage through said vessel; means for injecting gas into said vessel and means for removing gas from said vessel, with said removing means positioned substantially distant from said gas injecting means; gas deflecting means spaced along the upper interior of said vessel for deflecting said gas downward into the path of said material as it is being showered; and deflecting means comprising a plurality of baffles attached to said vessel by means of screws externally inserted through the wall of said vessel and into retaining portions of said baffles, each of said baffles being of a semi-circular configuration and is attached to extend laterally across the upper interior region of said vessel, and having its bottom edge inclined at approximately the angle of repose of said material therein.

2. Apparatus for use in treatment of organic particulate material comprising: a horizontally elongated cylinderical treatment vessel; an input opening in the side of said vessel near one end of said vessel and an adjustable height weir opening near the other end of said vessel; means for moving the material to be treated through said vessel in a regular manner while maintaining the level of said material at a substantially constant height along the length of said vessel and showering said material during its passage through said vessel; means for injecting gas into said vessel and means for removing gas from said vessel, with said removing means positioned substantially distant from said gas injecting means, said means for moving comprising a plurality of buckets rotating about a common axis through said vessel, said buckets being attached to rods fixedly attached to an axle extending along said axis, and said rods having an index plate at the ends of each which cooperates with a floor plate of said buckets to maintain said buckets at discretely adjustable angles to said axis.

3. Apparatus as described in claim 2 wherein said index plate and said buckets have a plurality of matching holes for fixedly attaching said index plates and said buckets at predetermined discrete angles by insertion of bolts through some of said holes.

4. Apparatus for use in treatment of organic particulate material comprising: a horizontally elongated cylinderical treatment vessel; an input opening in the side of said vessel near one end of said vessel and an adjustable height weir opening near the other end of said vessel; means for moving the material to be treated through said vessel in a regular manner while maintaining the level of said material at a substantially constant height along the length of said vessel and showering said material during its passage through said vessel; means for injecting gas into said vessel and means for removing gas from said vessel, with said removing means positioned substantially distant from said gas injecting means; the means for moving comprising a plurality of buckets rotating about a common axis through said vessel, said buckets comprising a back wall portion, a floor plate and one side wall and having the top, end, and one side thereof open.

5. Apparatus for use in treatment of organic particulate material comprising: a horizontally elongated cylinderical treatment vessel; an input opening in the side of said vessel near one end of said vessel and an adjustable height weir opening near the other end of said vessel; means for moving the material to be treated through said vessel in a regular manner while maintaining the level of said material at a substantially constant height along the length of said vessel and showering said material during its passage through said vessel; means for injecting gas into said vessel and means for removing gas from said vessel, with said removing means positioned substantially distant from said gas injecting means, said adjustable weir opening being spaced distant from the output end of said vessel, and wherein means are provided in said vessel for moving material adjacent the output end of said chamber back toward said opening.

References Cited

UNITED STATES PATENTS

| | | | |
|---|---|---|---|
| 575,983 | 1/1897 | Perky | 259—109 XR |
| 702,127 | 6/1902 | Churchill | 34—182 |
| 1,126,587 | 1/1915 | Suzuki | 34—182 |
| 2,627,668 | 2/1953 | Handwerk | 34—182 XR |

FOREIGN PATENTS

| | | |
|---|---|---|
| 2,360 | 1/1904 | France. |
| 8,414 | 1887 | Great Britain. |

CHARLES J. MYHRE, *Primary Examiner.*

HARRY B. RAMEY, *Assistant Examiner.*

U.S. Cl. X.R.

259—109